Aug. 13, 1940. J. G. FRANCIS 2,211,414
STRAINER FASTENER FOR PERCOLATORS
Filed June 9, 1938
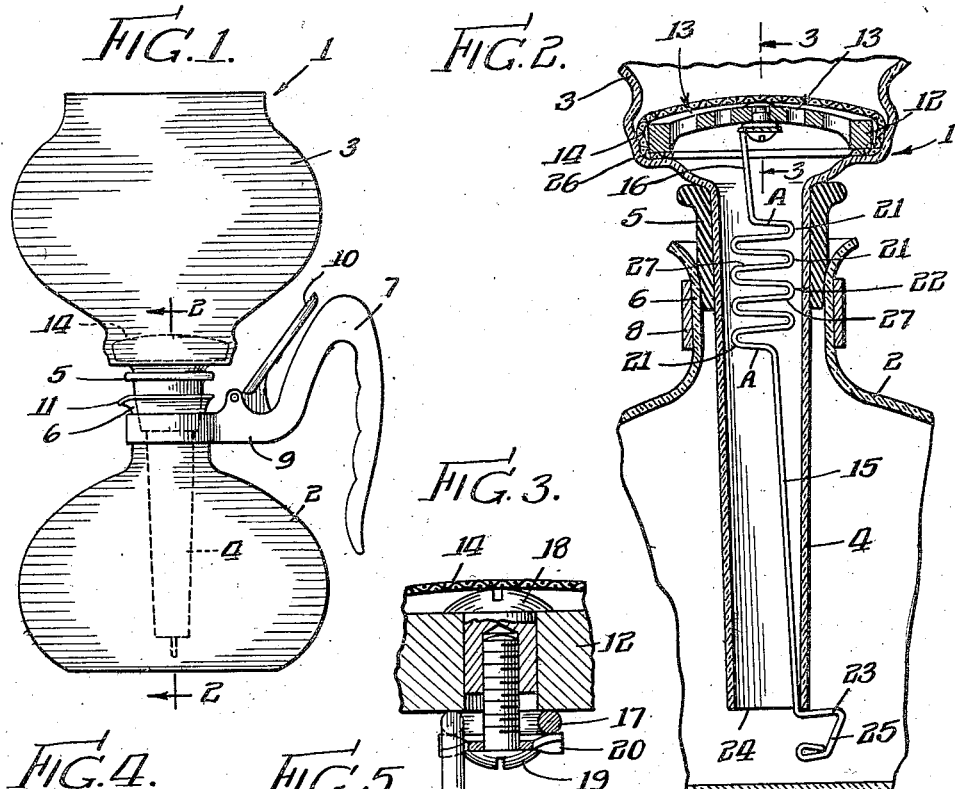
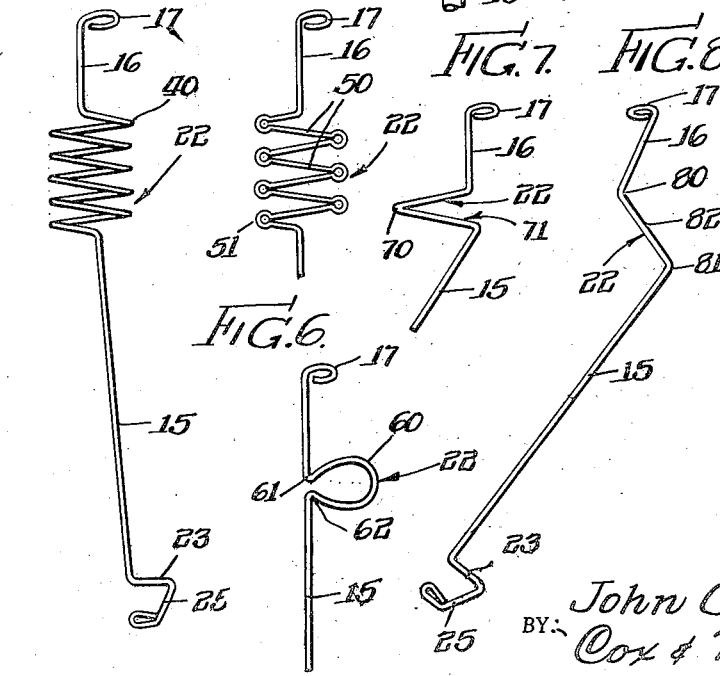
INVENTOR.
John G. Francis
BY Cox & Moore
ATTORNEYS.

Patented Aug. 13, 1940

2,211,414

UNITED STATES PATENT OFFICE 2,211,414

STRAINER FASTENER FOR PERCOLATORS

John G. Francis, Chicago, Ill., assignor to Chamberlain, Inc., Chicago, Ill., a corporation of Illinois Application June 9, 1938, Serial No. 212,667

1 Claim. (Cl. 53—3)

This invention relates to percolators in general and particularly to strainers for percolators. More specifically the invention relates to means for securing the strainer element and its cooperating cloth filter in position within the percolator bowl.

This application is a continuation in part of applicant's co-pending application Serial No. 188,414, filed February 3, 1938.

The primary object of the present invention is the provision of a new and improved fastening element for securing a strainer in the bowl of a percolator, the fastening element being easily and quickly applied without much effort, capable of being easily and readily cleaned, capable of being readily and economically manufactured, and being so constructed and arranged as to replenish its elasticity by simple manipulation should elongation take place through constant use.

Another object of the invention is the provision of a snap fastening element which will not become unsanitary during use, which can be quickly and readily cleaned, which can be easily and readily applied and removed by a simple manual operation, and which is easily and readily replaceable.

A further object of the invention is to provide an inexpensively constructed strainer retaining element having a pendulum snap fastening arrangement with the lower end of the spout of a percolator bowl so that the snap end is normally in position with respect to the funnel end of the percolator bowl so that it can be readily and quickly snapped into position.

Numerous other objects and advantages will be apparent throughout the progress of the following specification.

The accompanying drawing illustrates a selected embodiment of the invention and the views therein are as follows:

Fig. 1 is a detail elevational view of a coffee percolator of the vacuum type and embodying the invention;

Fig. 2 is a detail vertical sectional view on the line 2—2 of Fig. 1;

Fig. 3 is an enlarged detail sectional view on the line 3—3 of Fig. 2; and

Figs. 4 to 8, inclusive, are elevations of modified forms of fastening elements.

Referring to the drawing and particularly to Figs. 1 to 3 thereof, numeral 1 designates a percolator of the vacuum type having a lower bowl 2 and an upper bowl 3. The upper bowl 3 is provided with a tubular extension or stem 4 which extends downwardly into the lower bowl 2 a short distance from the bottom thereof. A rubber or other flexible collar 5, Fig. 2, is adapted to encircle the stem 4 so as to make a flexible as well as a tight connection between the upper bowl 3 and the lower bowl 2. The collar 5 about the stem 4 fits into the neck 6 of the lower bowl 2, as clearly shown in Fig. 2.

A handle 7 may be fastened to the neck 6 of the bowl 2 in any convenient manner, such as by a collar 8. This collar may include a fitting or connection 9 which pivotally connects a cover 10 whereby the opening in the neck 6 may be closed. The neck 6 may be provided with a lip 11 to permit the coffee to be readily and quickly poured from the lower bowl 2.

A strainer 12, preferably made of porcelain, is adapted to fit in the bottom of the bowl 3 immediately above the opening where the stem 4 connects with the bowl 3. This strainer 12 is provided with a plurality of openings 13 therethrough to permit the water from the bowl 2 to pass up into the bowl 3 for the purpose of making coffee and then, when the coffee is brewed, to pass back into the bottom bowl 2. A cloth filter 14 is suitably fastened around the strainer element 12 so as to filter the coffee and prevent any of the coffee grounds from entering the lower bowl 2.

The strainer element 12 and its cooperating filter element 14 would, of course, be dislodged from proper position if some means were not provided to securely hold the strainer and filter in proper position, and numerous attempts have been made to provide such a device. The invention herein disclosed provides a strainer fastener for percolators and comprises an integral one-piece wire member 15 which has a vertical portion 16 extending downwardly from the underside of the strainer body 12. The upper end of this straight portion 16 is formed in the shape of an eye 17, and is securely fastened to the strainer element 12 in any convenient manner, such as by a threaded sleeve 18 threadedly engaging a screw 19 extending centrally through the body of the strainer element 12, as shown in Fig. 3. A lock washer 20 may be arranged between the bottom of the strainer 12 and the upper surface of the eye 17 to hold the parts in locked position and to prevent revoluble movement of the member 15 with respect to the strainer 12.

The wire member 15 is preferably bent back and forth a number of times as indicated at 21, Fig. 2, to provide a flexible connection 22 whereby slight elongation may be effected to permit the snap end 23 to be easily and readily snapped about the lower end 24 of the glass spout or stem 4. A finger piece 25 is preferably formed below the snap 23 for manual manipulation of the fastening member.

The filter with its connected fastener is arranged in the top bowl 3 with the end 25 extending downwardly and pressed in position until the strainer fits on the bottom supporting edge 26 of the bowl 2 with a part of the finger piece 25 extending below the bottom edge of the stem 4. The finger piece is then manually moved until the snap portion 23 snaps over the bottom edge 24 of the stem. To remove the strainer 12, all that is necessary is slight movement of the member 23. This may be accomplished by pressing on the finger piece 25. As shown in Fig. 2 the device is in snapped position but, when it is desired to disconnect or unsnap the structure, all that is required is that the bottom edge 25 be moved to the left so as to free the snap 23 from the bottom edge 24 of the stem 4. The parts will then become instantly freed.

The flexible portion 22 which is arranged intermediate the upper and lower ends of the wire member 15 merely comprises bending the round, smooth wire back and forth upon itself, in the same plane, thereby providing a very sanitary, resilient portion, permitting easy attaching to the percolator stem and at the same time eliminating the inherent disadvantages of fasteners of the coil spring type. In devices employing a coil spring the foam, coffee grounds and sediment become lodged between the coils of the spring and cause an extremely unsanitary condition as well as making it extremely difficult to clean. The wire fastener member 15 in the present invention is preferably made of springy stainless steel, and inasmuch as the relatively parallel but spaced portions 27 are relatively wide apart, are made of round wire, and have open spaces at the bends 21, the device can be instantly cleaned and always maintained in a sanitary condition.

In Fig. 4 a modified device is shown, there being relatively sharp or angular bends 40 in the same plane providing the intermediate, expansible, resilient section 22.

In Fig. 5 the relatively horizontal connecting portions 50 are provided with eyes 51 at their connecting extremities as clearly shown in the figure.

The device shown in Fig. 6 comprises a single loop 60 extending upwardly from the bend 61 and then outwardly, connecting with the main stem 15 at the point indicated at 62. This portion 60 in the form of an eye or a half-loop comprises the resilient portion 22 of the structure shown in Fig. 6.

The flexible portion 22 in Fig. 7 comprises a relatively sharp bend at 70 to provide a V-shaped section 71.

The structure shown in Fig. 8 is similar to the other constructions herein mentioned except that bends 80 and 81 are provided, there being the integral connecting portion 82 which, taken in connection with the bends 80 and 81, provides the resilient section or portion 22.

The devices shown in Figs. 4 to 8, inclusive, also include eyes 17 for fastening the member 15 to the porcelain strainer, as clearly disclosed in Fig. 3. These modified structures also are provided with a snap piece 23 which is adapted to extend over the extreme bottom end 24 of the glass stem 4. Finger pieces 25 are also formed on the members for manual manipulation.

The structures disclosed in Figs. 1 to 8, inclusive, are flat and are distinctively an advantage over the conventional strainer fasteners in that the tension of the spring, that is, of the resilient portion 22, can be easily put back into the spring should the element tend to elongate or lose its tensioning power during use. The tensioning power can be put back into the spring by merely pressing the leaves or straight portions toward each other, that is, by pressing at the points indicated at A in Fig. 2 the zigzags or the straight portions 27 will be drawn closer together, thereby retensioning the spring. This retensioning can also be applied to the devices shown in Figs. 4 to 8, inclusive. Furthermore, the springs shown do not block the passage in the tubular spout 4 to any considerable extent and considerably less than the conventional vertical coil spring now in use. This latter feature adds greatly to the sanitation, as the water and coffee passing through the spout do not come in contact with as much metal surface.

The invention provides a simple, positively operating, inexpensively manufactured device which is sanitary, which can be easily cleaned, and which can be applied and removed readily and easily. The snap herein shown causes the strainer and its cooperating filter to be positively held in position and prevented from becoming dislodged. This snap structure further permits the strainer and filter to be quickly and easily removed from the upper percolator bowl 3.

Changes may be made in the form, construction and arrangement of the parts without departing from the spirit of the invention or sacrificing any of its advantages and the right is hereby reserved to make all such changes as fairly fall within the scope of the following claim.

The invention is hereby claimed as follows:

In combination with a percolator bowl having a downwardly extending stem and a strainer element in the bowl above the stem, a fastener element for securing the strainer element in position in the percolator bowl, said fastener element comprising a pendulum snap fastener member, said member having a fastening means at one extremity for securement to the strainer element and being adapted to extend downwardly centrally through the stem, a snap adjacent the lower portion of said member for engagement adjacent the lower extremity of the stem and means intermediate the extremities of said member operative to permit resilient and flexible elongation and extension of the member and yielding gripping of the stem by the member, said last-named means comprising a continuous, intermediate length of said member formed to provide a plurality of laterally extending, spaced arms joined by integral, alternately oppositely facing reverse bends, said intermediate length being disposed in a flat vertical plane for providing a minimum of obstruction.

JOHN G. FRANCIS.